US012562506B2

(12) United States Patent
Lin et al.

(10) Patent No.: US 12,562,506 B2
(45) Date of Patent: Feb. 24, 2026

(54) ANTENNA, CONTROL METHOD THEREOF, ANTENNA ARRAY AND ELECTRONIC DEVICE

(71) Applicants: BEIJING BOE SENSOR TECHNOLOGY CO., LTD., Beijing (CN); BOE TECHNOLOGY GROUP CO., LTD., Beijing (CN)

(72) Inventors: Zixiang Lin, Beijing (CN); Xiaoqiang Yang, Beijing (CN); Cuiwei Tang, Beijing (CN); Wei Zhao, Beijing (CN); Lu Chen, Beijing (CN); Yiming Wang, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 148 days.

(21) Appl. No.: 18/022,404

(22) PCT Filed: May 20, 2022

(86) PCT No.: PCT/CN2022/094145
§ 371 (c)(1),
(2) Date: Feb. 21, 2023

(87) PCT Pub. No.: WO2023/221098
PCT Pub. Date: Nov. 23, 2023

(65) Prior Publication Data
US 2024/0266759 A1 Aug. 8, 2024

(51) Int. Cl.
*H01Q 23/00* (2006.01)
*H01P 1/18* (2006.01)
(Continued)

(52) U.S. Cl.
CPC ............. *H01Q 23/00* (2013.01); *H01P 1/182* (2013.01); *H01Q 3/36* (2013.01); *H01Q 21/0006* (2013.01)

(58) Field of Classification Search
CPC ...... H01Q 3/36; H01Q 21/0006; H01Q 23/00; H01P 1/182
See application file for complete search history.

(56) References Cited

U.S. PATENT DOCUMENTS

2020/0381824 A1* 12/2020 Kao ........................ H01Q 3/36
2021/0265713 A1* 8/2021 Fang .................... H01Q 9/0457
(Continued)

FOREIGN PATENT DOCUMENTS

CN 108563050 A 9/2018
CN 108780946 A 11/2018
(Continued)

*Primary Examiner* — Amal Patel
(74) *Attorney, Agent, or Firm* — Nath, Goldberg & Meyer; Joshua B. Goldberg

(57) ABSTRACT

An antenna, a control method for an antenna, an antenna array and an electronic device are provided, and belong to the field of communication technology. The antenna includes a first tunable dielectric layer between the first dielectric substrate and the second dielectric substrate opposite to each other; a radiation component and at least one first tuning electrode on the first dielectric substrate; at least one second tuning electrode and a reference electrode layer on the second dielectric substrate; orthographic projections of the radiation component, the first tuning electrode and the second tuning electrode on the first dielectric substrate overlap with an orthographic projection of the reference electrode layer on the first dielectric substrate. Orthographic projections of each first tuning electrode and a corresponding second tuning electrode on the first dielectric substrate at least partially overlap with each other, to form a tunable capacitor electrically connected to the radiation component.

9 Claims, 3 Drawing Sheets

(51) Int. Cl.
*H01Q 3/36* (2006.01)
*H01Q 21/00* (2006.01)

(56) References Cited

U.S. PATENT DOCUMENTS

| | | | | |
|---|---|---|---|---|
| 2022/0021094 | A1* | 1/2022 | Wu | H01Q 3/36 |
| 2022/0045413 | A1* | 2/2022 | Jia | H01P 1/2039 |
| 2022/0352623 | A1* | 11/2022 | Wang | H01Q 9/0421 |

FOREIGN PATENT DOCUMENTS

| | | | | |
|---|---|---|---|---|
| CN | 109066021 | A | 12/2018 | |
| CN | 112164875 | A | 1/2021 | |
| CN | 112768851 | A | 5/2021 | |
| EP | 3823088 | A1 * | 5/2021 | H01P 1/18 |
| JP | H1026765 | A | 1/1998 | |
| WO | WO-2020233697 | A1 * | 11/2020 | G02F 1/1313 |
| WO | 2022/099473 | A1 | 5/2022 | |

* cited by examiner

ANTENNA, CONTROL METHOD THEREOF, ANTENNA ARRAY AND ELECTRONIC DEVICE

This is a National Phase Application filed under 35 U.S.C. 371 as a national stage of PCT/CN2022/094145, filed May 20, 2022, the content of which is hereby incorporated by reference in its entirety.

TECHNICAL FIELD

The present disclosure relates to the field of communication technology, and in particular to an antenna, a control method thereof, an antenna array, and an electronic device.

BACKGROUND

A liquid crystal antenna array is used as a device for receiving and transmitting wireless signals, an operating frequency range of the liquid crystal antenna array directly influences the operating performance of the whole wireless communication system. There is often a certain frequency deviation between an actual measurement result and a simulation result of the operating frequency range of the liquid crystal antenna array due to a manufacturing process tolerance of the liquid crystal antenna array, which influences a gain and an antenna efficiency of the antenna array.

SUMMARY

The present disclosure is directed to at least one of the technical problems in the prior art, and provides an antenna, a control method thereof, an antenna array, and an electronic device.

In a first aspect, the embodiment of the present disclosure provides an antenna, including a first dielectric substrate and a second dielectric substrate opposite to each other: a first tunable dielectric layer between the first dielectric substrate and the second dielectric substrate; a radiation component and at least one first tuning electrode on the first dielectric substrate; at least one second tuning electrode and a reference electrode layer on the second dielectric substrate: orthographic projections of the radiation component, the at least one first tuning electrode and the at least one second tuning electrode on the first dielectric substrate overlap with an orthographic projection of the reference electrode layer on the first dielectric substrate; and orthographic projections of each first tuning electrode and a corresponding second tuning electrode on the first dielectric substrate at least partially overlap with each other, to form a tunable capacitor electrically connected to the radiation component.

In some embodiments, each first tuning electrode is used as the radiation component and the radiation component is used as each first tuning electrode.

In some embodiments, the antenna further includes a first control line electrically connected to the radiation component, and at least one second control line electrically connected to the at least one second tuning electrode in a one-to-one correspondence.

In some embodiments, the antenna further includes a first control line electrically connected to the radiation component, and a second control line electrically connected to the at least one second tuning electrode; and the at least one second tuning electrode is connected to the same second control line.

In some embodiments, the antenna further includes a phase shifter connected to the radiation component.

In some embodiments, the phase shifter includes a first transmission line on a side of the first dielectric substrate close to the first tunable dielectric layer; a second transmission line on a side of the second dielectric substrate close to the first tunable dielectric layer; and a second tunable dielectric layer between a layer on which the first transmission line is located and a layer on which the second transmission line is located.

In some embodiments, the first tunable dielectric layer is shared as the second tunable dielectric layer.

In a second aspect, an embodiment of the present disclosure further provides a control method for an antenna, the antenna is the antenna in any one of the above embodiments: the method includes: applying a first voltage to the radiation component and the at least one first tuning electrode; and applying a second voltage to the at least one second tuning electrode according to a pre-stored table of a mapping relationship between the first voltage and the second voltage.

In some embodiments, before applying a first voltage to the radiation component and the at least one first tuning electrode, and applying a second voltage to the at least one second tuning electrode according to a pre-stored table of a mapping relationship between the first voltage and the second voltage, the method further includes: applying the first voltage to the radiation component, obtaining a return loss of the antenna, and calculating a frequency offset corresponding to the first voltage; and when it is determined that the frequency offset meets a preset compensation range, applying the first voltage to the at least one first tuning electrode; applying a test voltage to the at least one second tuning electrode and adjusting a magnitude of the test voltage, so that the frequency offset corresponding to the obtained return loss of the antenna exceeds the preset compensation range; and generating the table of the mapping relationship between the first voltage and the second voltage by taking the test voltage having the corresponding magnitude as the second voltage.

In some embodiments, the applying the first voltage to the radiation component, obtaining a return loss of the antenna, and calculating a frequency offset corresponding to the first voltage, includes: applying the first voltage to the radiation component, obtaining the return loss of the antenna through a vector network analyzer, and calculating the frequency offset corresponding to the first voltage.

In a third aspect, an embodiment of the present disclosure provides an antenna array, which includes a plurality of antennas, each of which is the antenna in any one of the above embodiments.

In a fourth aspect, an embodiment of the present disclosure provides an electronic device, which includes the antenna array in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising". "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
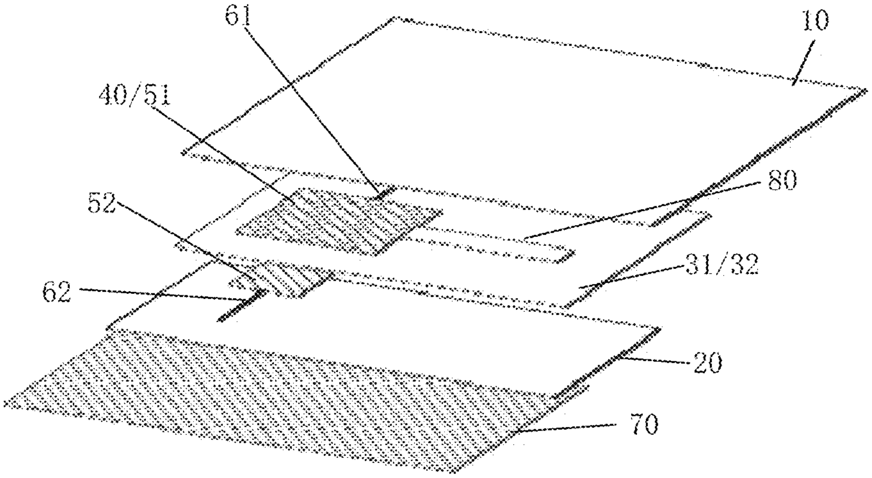
FIG. 1 is a schematic diagram of a structure of an antenna according to an embodiment of the present disclosure.
Figure 2:
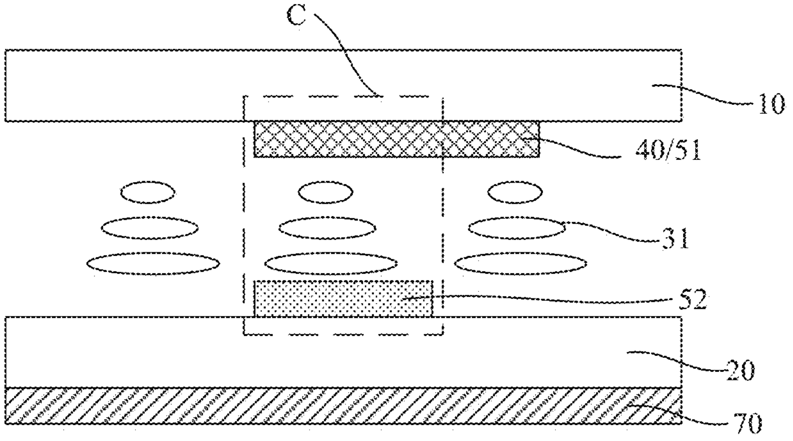
FIG. 2 is a cross-sectional view of a portion of an antenna according to an embodiment of the present disclosure.

In a first aspect, FIG. 1 is a schematic diagram of a structure of an antenna according to an embodiment of the present disclosure. FIG. 2 is a cross-sectional view of a portion of an antenna according to an embodiment of the present disclosure. As shown in FIGS. 1 and 2, the present disclosure provides an antenna, which includes a first dielectric substrate 10 and a second dielectric substrate 20 disposed opposite to each other, a first tunable dielectric layer 31 disposed between the first dielectric substrate 10 and the second dielectric substrate 20, a radiation component 40 and at least one first tuning electrode 51 disposed on the first dielectric substrate 10, at least one second tuning electrode 52 and a reference electrode layer 70 disposed on the second dielectric substrate 20. Orthographic projections of each first tuning electrode 51 and a corresponding second tuning electrode 52 on the first dielectric substrate 10 at least partially overlap with each other, to form a tunable capacitor C between the first tuning electrode 51 and the second tuning electrode 52 and electrically connected to the radiation component 40. In the embodiment of the present disclosure, the radiation component 40 and the at least one first tuning electrode 51 may be disposed on a side of the first dielectric substrate 10 close to the first tunable dielectric layer 31, or on a side of the first dielectric substrate 10 away from the first tunable dielectric layer 31. The at least one second tuning electrode 52 may be disposed on the side of the second dielectric substrate 20 close to the second tunable dielectric layer 32, or on a side of the second dielectric substrate 20 away from the first tunable dielectric layer 31. The reference electrode layer 70 is disposed on the side of the second dielectric substrate 20 away from the first tunable dielectric layer 31.

In FIGS. 1 and 2, as an example, the radiation component 40 and the at least one first tuning electrode 51 are both arranged on the side of the first dielectric substrate 10 close to the first tunable dielectric layer 31, the at least one second tuning electrode 52 is arranged on the side of the second dielectric substrate 20 close to the first tunable dielectric layer 31, and the reference electrode layer 70 is arranged on the side of the second dielectric substrate 20 away from the first tunable dielectric layer 31. It should be understood, however, that the arrangement does not limit the scope of the embodiments of the present disclosure.

In some examples, the first tunable dielectric layer 31 includes, but is not limited to, a liquid crystal layer. As an example, the first tunable dielectric layer 31 is the liquid crystal layer in the following description of the embodiments of the present disclosure.

Sizes of the tunable capacitor C, each first tuning electrode 51 and each second tuning electrode 52, and a dielectric constant of the liquid crystal layer in the embodiment of the present disclosure have the following relationship as shown in formula (1):

$$C = \frac{\varepsilon S}{d} \tag{1}$$

Where ε is a dielectric constant of a liquid crystal material, S is an overlapping area of first and second tuning electrodes 51, 52 corresponding to each other, and d is a distance between the first and second tuning electrodes 51, 52.

Figure 3:
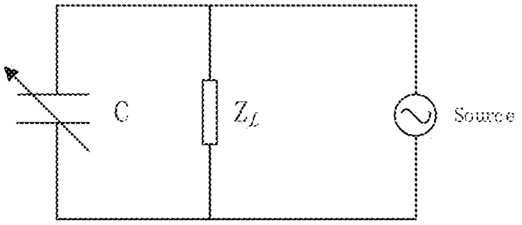
FIG. 3 is an equivalent circuit diagram of an antenna according to an embodiment of the present disclosure.

The dielectric constant ε of the liquid crystal material is changed by means of the tunable characteristic of the dielectric constant of the liquid crystal material by applying bias voltages to the first tuning electrode 51 and the second tuning electrode 52 corresponding to each other, so that a capacitance of the tunable capacitor C is changed, an input impedance $Z_L$ of antenna ports is changed, thereby eliminating or reducing the frequency deviation caused by process tolerances, and achieving the calibration, where $Z_L$ is an equivalent load of an antenna, as shown in FIG. 3.

In the antenna according to the embodiment of the present disclosure, since the radiation component 40 is electrically connected to the tunable capacitor C formed by the first tuning electrode 51 and the second tuning electrode 52. For example: the radiation component is electrically connected to the first tuning electrode 51, and a second voltage may be applied to the second tuning electrode 52 according to a first voltage applied to the first radiation component and a pre-stored table of a mapping relationship between the first voltage and the second voltage, so as to adjust the dielectric constant of the liquid crystal layer between the first tuning electrode 51 and the second tuning electrode 52, thereby adjusting the capacitance of the tunable capacitor C, further eliminating the shifting of the operating frequency of the antenna caused by process tolerances, and improving the gain and efficiency of the antenna.

In some examples, the first tuning electrode 51 in the embodiments of the present disclosure may be used as the radiation component 40 and the radiation component 40 may be used as the first tuning electrode 51. i.e., the radiation component 40 not only can radiate radio frequency signals, but also can be used as the first tuning electrode 51 of the tunable capacitor C. The first tuning electrode 51 may be used as the radiation component 40 and the radiation component 40 may be used as the first tuning electrode 51, so that in the embodiment of the present disclosure, the radiation component 40 and the first tuning electrode 51 are applied with the same voltage signal, and it is not necessary to separately provide a control line to apply a voltage to the first tuning electrode 51, which reduces wiring and is easy to control. The first tuning electrode 51 may be used as the radiation component 40 and the radiation component 40 may be used as the first tuning electrode 51, so that a size of the antenna can be effectively reduced.

Further, in addition to the above structure, the antenna further includes a first control line 61 electrically connected to the radiation component 40, and at least one second control line 62 electrically connected to the at least one second tuning electrode 52. When the at least one second tuning electrode 52 includes a plurality of second tuning electrodes 52, a plurality of second control lines 62 and the plurality of first tuning electrodes 51 may be connected to each other in one-to-one correspondence, or the plurality of second tuning electrodes 52 may be connected to a same second control line.

In the embodiment of the present disclosure, the radiation component 40 and the first control line 61 may be disposed in the same layer or in different layers. When the radiation component 40 and the first control line 61 are disposed in the same layer, the first control line 61 may be directly electrically connected to the radiation component 40. In this case, the first control line 61 and the radiation component 40 may be formed through a single process, which is helpful to achieve the lightweight and thinness of the antenna structure. When the radiation component 40 and the first control line 61 are respectively disposed in two layers with an interlayer insulating layer disposed therebetween, the first control line 61 may be connected to the radiation component 40 in a cross-layer way through a via extending through the insulating layer. Similarly, the at least one second tuning electrode 52 and the at least one second control line 62 may be disposed in the same layer, and directly electrically connected to each other; alternatively, the at least one second tuning electrode 52 and the at least one second control line 62 may be provided in different layers, and may be electrically connected to each other in a cross-layer way.

In some examples, the at least one second tuning electrode 52 may be a rectangular or circular patch. A shape of the at least one second tuning electrode 52 is not specifically limited in the embodiments of the present disclosure, and may be specifically designed according to specific requirements on the antenna performance. The at least one second tuning electrode 52 may be made of a metal material, specifically, copper or other metal.

In some examples, in addition to the above structure, the antenna further includes a phase shifter 80. The phase shifter 80 may be a one wire phase shifter 80 or a differential twin wire phase shifter 80. In the embodiment of the present disclosure, as an example, the phase shifter 80 is a differential phase shifter 80. The second tunable dielectric layer 32 in the phase shifter 80 includes, but is not limited to, a liquid crystal layer. In the embodiment of the present disclosure, as an example, the second tunable dielectric layer 32 is a liquid crystal layer, that is, the second tunable dielectric layer may be used as the first tunable dielectric layer 31, and the first tunable dielectric layer 31 may be used as the second tunable dielectric layer 32.

Figure 4:
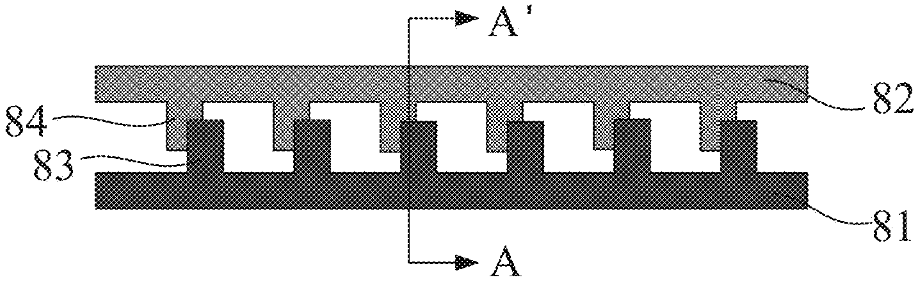
FIG. 4 is a schematic diagram of a portion of a phase shifter of an antenna according to an embodiment of the present disclosure.
Figure 5:
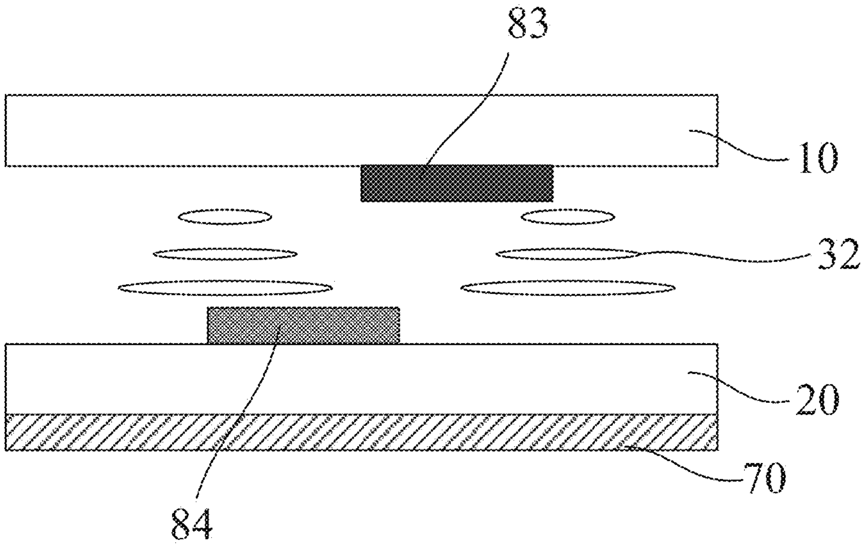
FIG. 5 is a cross-sectional view taken along a line A-A' of FIG. 4.

FIG. 4 is a schematic diagram of a portion of a phase shifter 80 of an antenna according to an embodiment of the present disclosure. FIG. 5 is a cross-sectional view taken along a line A-A' of FIG. 4. As shown in FIGS. 4 and 5, the phase shifter 80 includes a first transmission line disposed on the first dielectric substrate 10 and a second transmission line disposed on the second dielectric substrate 20, and a liquid crystal layer disposed between the first transmission line and the second transmission line. The first transmission line includes a first main line 81, and a plurality of first branches 83 connected to different positions of the first main line 81 in an extending direction of the first main line 81: the second transmission line includes a second main line 82 and a plurality of second branches 84 connected to different positions of the second main line 82 in an extending direction of the second main line 82. Orthographic projection of a first branch 83 and a second branch 84 corresponding to each other on the first dielectric substrate 10 at least partially overlap with each other, defining an overlapping region (i.e., a capacitive region) located between the orthographic projections of the first and second main lines 81 and 82 on the first dielectric substrate 10. Bias voltages are applied to the first main line 81 and the second main line 82, so that an electric field is formed in the capacitive region to change the dielectric constant of the liquid crystal molecules, thereby realizing the phase shift of the microwave signal.

Figure 6:
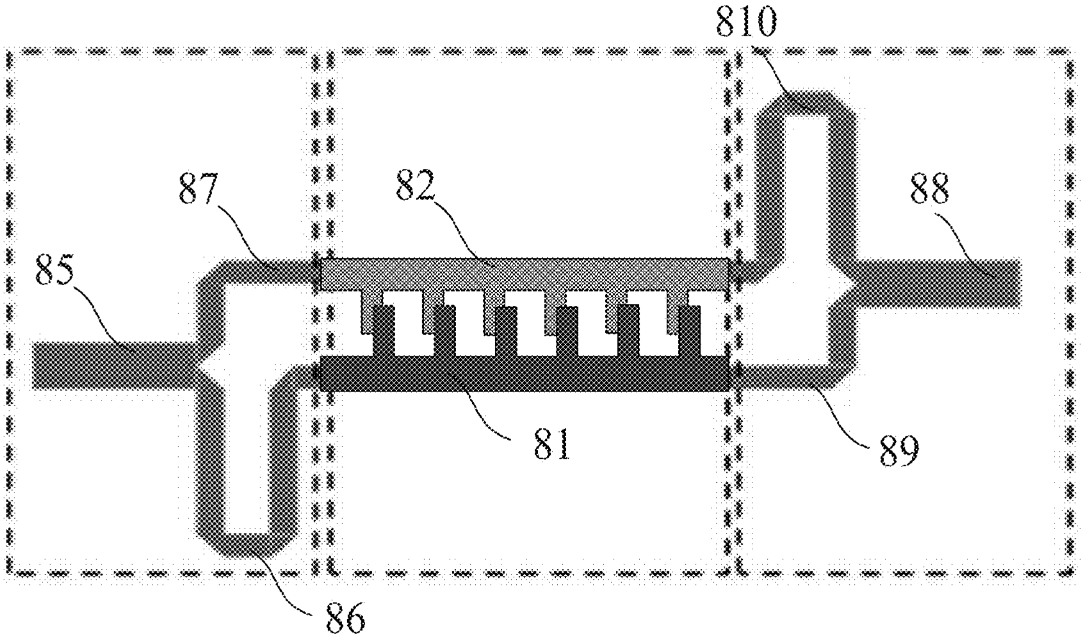
FIG. 6 is a schematic diagram of a phase shifter of an antenna according to an embodiment of the present disclosure.

Further, since the differential liquid crystal phase shifter 80 is mainly characterized by operating in a differential mode, it has a higher phase shifting efficiency than the one wire phase shifter 80. However, in order to provide a differential mode signal, a first BALUN component and a second BALUN component need to be added at input and output ends of the phase shifter 80, respectively, as shown in FIG. 6; the first BALUN component includes a main path 85, a first branch 86, and a second branch 87; the second BALUN component includes a main branch 88, a first branch 89, and a second branch 810. For the first BALUN component, first ends of the first branch 86 and the second branch 87 are connected to the main path 85, a second end of the first branch 86 is connected to a first end of the first main line 81, and a second end of the second branch 87 is connected to a first end of the second main line 82. For the second BALUN component, first ends of the first branch 89 and the second branch 810 are connected to the main path 88, a second end of the first branch 89 is connected to a second end of the first main line 81, and a second end of the second branch 810 is connected to a second end of the second main line 82. In addition, the first branch 86 of the first BALUN component and the second branch 810 of the second BALUN component are serpentine lines, so that the first branch 86 and the second branch 87 of the first BALUN component have a phase difference of 180° therebetween, and the first branch 89 and the second branch 810 of the second BALUN component have a phase difference of 180° therebetween. In this case, the main path 85 of the first BALUN component is used as an input end for the radio frequency signal, the main path 88 of the second BALUN component is used as an output end for the radio frequency signal, the radio frequency signal fed into the first transmission line by the first branch 86 of the first BALUN component and the radio frequency signal fed into the second transmission line by the second branch 87 have a phase difference of 180° therebetween, and are transmitted to the first branch 89 and the second branch 810 of the second BALUN component via the first transmission line and the second transmission line, respectively, so that the radio frequency signals are restored and output as the microwave signals with the same phase and the same amplitude which are fed out through the main path 88 of the second BALUN component. It should be noted that a BALUN (balance-unbalance) component is a three-port device that can be applied in a microwave radio frequency device, and is a radio frequency transmission line transformer that converts a matching input into a differential input, and can be used for exciting a differential line, an amplifier, a wideband antenna, a balanced mixer, a balanced frequency multiplier and a modulator, a phase shifter 80, and any circuit design that requires a transmission for signals with a same amplitude and a phase difference of 180° on two lines. Two outputs of the BALUN component have a same amplitude and opposite phases. In the frequency domain, this means that there is a phase difference of 180° between the two outputs: in the time domain, this means that a voltage of one balanced output is a negative value of the other balanced output.

When the phase shifter 80 in the embodiment of the present disclosure includes the first BALUN component and the second BALUN component described above, the main path of the second BALUN component may be connected to the radiation component 40. In the embodiment of the present disclosure, the first BALUN component and the second BALUN component may be disposed on the first dielectric substrate 10. At this time, the second branch 87 of the first BALUN component may be coupled to a first end of the second transmission line, and the second branch 810 of the second BALUN component may be coupled to a second end of the second transmission line. Alternatively, a feed structure may also be included in the antenna structure, and may be connected to the main path 85 of the first BALUN component.

It should be noted that only one exemplary structure of the phase shifter 80 is given above, but the phase shifter 80 in the embodiment of the present disclosure is not limited thereto, and various forms of the phase shifter 80 may be applied to the antenna in the embodiment of the present disclosure, which is not listed here.

In some examples, the radiation component 40 in the embodiments of the present disclosure may be a radiation patch, and a shape of the radiation patch may be a rectangle, a circle, a triangle, an octagon or the like. Alternatively, the radiation component 40 is not limited to the radiation patch, and may also be a dipole or the like. The radiation component 40 may be selected specifically according to requirements.

In some examples, the first dielectric substrate 10 and the second dielectric substrate 20 in the embodiment of the present disclosure may be a glass-based substrate, a printed circuit board (PCB), or the like. A material of the first dielectric substrate 10 and the second dielectric substrate 20 is not limited in the embodiment of the present disclosure.

In a second aspect, an embodiment of the present disclosure further provides a control method for an antenna, where the method is used for controlling the antenna, and the method includes: applying a first voltage to the radiation component 40 and the at least one first tuning electrode 51, and applying a second voltage to the at least one second tuning electrode 52 according to a pre-stored table of a mapping relationship between the first voltage and the second voltage. By the method, the dielectric constant of the liquid crystal layer between the at least one first tuning electrode 51 and the at least one second tuning electrode 52 is adjusted, thereby adjusting the capacitance of the tunable capacitor C, further eliminating the shifting of the operating frequency of the antenna caused by process tolerances, and improving the gain and efficiency of the antenna.

In some examples, before the applying a first voltage to the radiation component 40 and the at least one first tuning electrode 51, and applying a second voltage to the at least one second tuning electrode 52 according to a pre-stored table of a mapping relationship between the first voltage and the second voltage, the method in the embodiment of the present disclosure further includes, acquiring the table of the mapping relationship between the first voltage and the second voltage.

Figure 7:
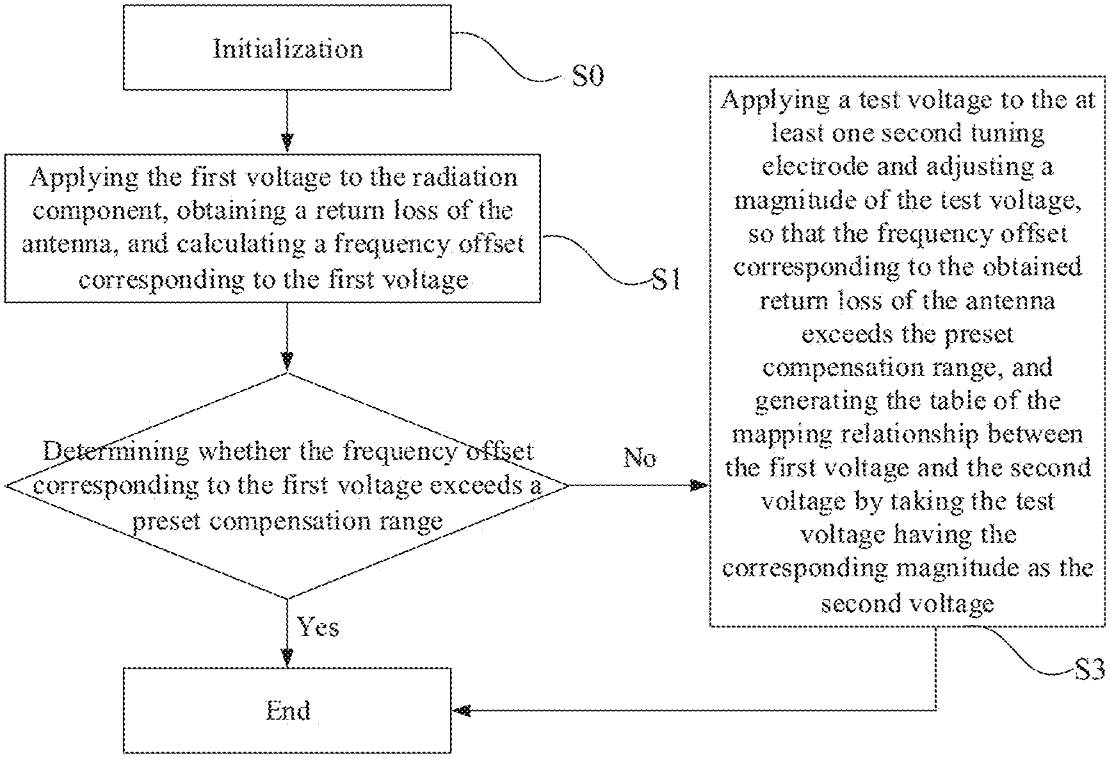
FIG. 7 is a flowchart illustrating a part of steps of a control method for an antenna according to an embodiment of the present disclosure.

Specifically, as shown in FIG. 7, the acquiring the table of the mapping relationship between the first voltage and the second voltage, includes steps:

S0, initializing the setup.

Figure 8:
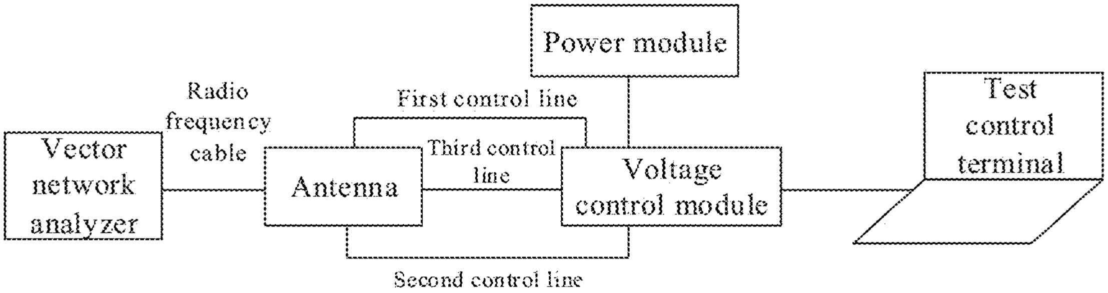
FIG. 8 is a schematic diagram illustrating a test environment in step S0 of the control method for an antenna according to an embodiment of the present disclosure.

Specifically, the step S0 includes: finishing s calibration for a vector network analyzer and a construction of a test environment. The construction of the test environment includes: electrically connecting the vector network analyzer to the antenna through a radio frequency cable, electrically connecting the radiation component 40/the at least one first tuning electrode 51 to a voltage control module through the first control line 61, electrically connecting the at least one second tuning electrode 52 to the voltage control module through the at least one second control line, electrically connecting the reference electrode layer of the antenna to the voltage control module through a third control line, and electrically connecting the voltage control module to a power module and a test control terminal, as shown in FIG. 8.

S1, applying the first voltage to the radiation component 40, obtaining a return loss of the antenna, and calculating a frequency offset corresponding to the first voltage.

Specifically, the test control terminal controls the voltage control module to load the first voltage provided by the power module to the first radiation component 40, the vector network analyzer obtains the return loss of the antenna, and calculates the frequency offset corresponding to the first voltage. It should be noted that no voltage is applied to the at least one second tuning electrode 52 in this step.

S2, determining whether the frequency offset corresponding to the first voltage exceeds a preset compensation range, if the frequency offset exceeds the preset compensation range, ending the process, and if the frequency offset does not exceed the preset compensation range, executing the following step S3.

Specifically, step S2 may include determining, by the test control terminal, whether the frequency offset corresponding to the first voltage calculated by the vector network analyzer exceeds the preset compensation range.

S3, applying a test voltage to the at least one second tuning electrode 52 and adjusting a magnitude of the test voltage, so that the frequency offset corresponding to the obtained return loss of the antenna exceeds the preset compensation range, and generating the table of the mapping relationship between the first voltage and the second voltage by taking the test voltage having the corresponding magnitude as the second voltage.

Specifically, step S3 includes: when the test control terminal determines that the frequency offset corresponding to the first voltage calculated by the vector network analyzer does not exceed the preset compensation range, controlling, by the test control terminal, the voltage control module to load the test voltage provided by the power module onto the at least one second tuning electrode 52, adjusting the test voltage loaded onto the at least one second tuning electrode 52 according to the return loss of the antenna obtained by the vector network analyzer until the frequency offset corresponding to the obtained return loss of the antenna exceeds the preset compensation range, and then generating the table of the mapping relationship between the first voltage and the second voltage by taking the test voltage as the second voltage, and storing the table in the test control terminal.

Figure 9:
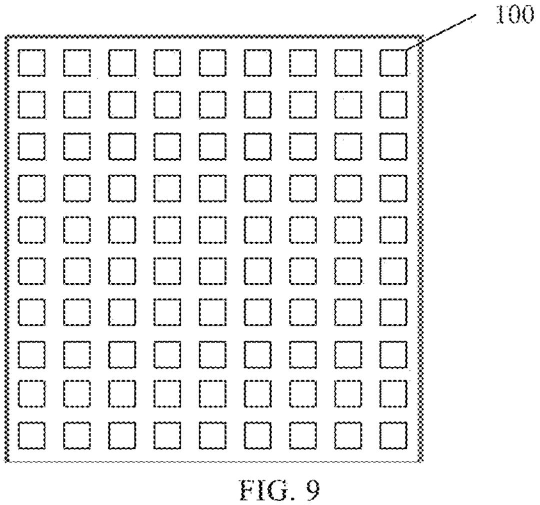
FIG. 9 is a schematic diagram of an antenna array according to an embodiment of the present disclosure.

In a third aspect, FIG. 9 is a schematic diagram of an antenna array according to an embodiment of the present disclosure. As shown in FIG. 9, an embodiment of the present disclosure further provides an antenna array, including the antenna 100 in any one of the above embodiments.

In some examples, the antennas in the antenna array may be arranged in a rectangle, in a circle, or in a triangle. The arrangement of the antenna array is not limited in the embodiments of the present disclosure.

In a fourth aspect, an embodiment of the present disclosure further provides an electronic device which includes the above antenna array. An antenna system provided by the embodiment of the present disclosure further includes a transceiver unit, a radio frequency transceiver, a signal amplifier, a power amplifier, and a filtering unit. The antenna in the antenna system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by a antenna in an antenna system and is processed by the filtering unit, the power amplifier, the signal amplifier, and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna system, the signal amplifier is used for improving a signal-to-noise ratio of the signals output by the radio frequency transceiver and then transmitting the signals to the filtering unit: the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising: a first dielectric substrate and a second dielectric substrate opposite to each other; a first tunable dielectric layer between the first dielectric substrate and the second dielectric substrate; a radiation component and a first tuning electrode on the first dielectric substrate; and a second tuning electrode and a reference electrode layer on the second dielectric substrate; wherein orthographic projections of the radiation component, the first tuning electrode and the second tuning electrode on the first dielectric substrate overlap with an orthographic projection of the reference electrode layer on the first dielectric substrate; and wherein orthographic projections of the first tuning electrode and the second tuning electrode on the first dielectric substrate at least partially overlap with each other, to form a tunable capacitor electrically connected to the radiation component; wherein the first tuning electrode is used as the radiation component and the radiation component is used as the first tuning electrode, and the first tuning electrode and the radiation component are formed as a single piece; the antenna further comprises a phase shifter electrically connected to the radiation component; wherein the phase shifter comprises a first transmission line on a side of the first dielectric substrate close to the first tunable dielectric layer; a second transmission line on a side of the second dielectric substrate close to the first tunable dielectric layer; and a second tunable dielectric layer between the first transmission line and the second transmission line; the first transmission line, the radiation component and the first tuning electrode are arranged on the first dielectric substrate, and an orthographic projection of the first transmission line on the first dielectric substrate does not overlap with an orthographic projection of the radiation component and the first tuning electrode on the first dielectric substrate; and the second transmission line and the second tuning electrode are arranged on the second dielectric substrate; and wherein the first tunable dielectric layer is shared as the second tunable dielectric layer.

2. The antenna of claim 1, further comprising: a first control line electrically connected to the radiation component, and a second control line electrically connected to the second tuning electrode.

3. A control method for an antenna, wherein the antenna comprises: a first dielectric substrate and a second dielectric substrate opposite to each other; a first tunable dielectric layer between the first dielectric substrate and the second dielectric substrate; a radiation component and a first tuning electrode on the first dielectric substrate; and a second tuning electrode and a reference electrode layer on the second dielectric substrate; wherein orthographic projections of the radiation component, the first tuning electrode and the second tuning electrode on the first dielectric substrate overlap with an orthographic projection of the reference electrode layer on the first dielectric substrate; and wherein orthographic projections of the first tuning electrode and the second tuning electrode on the first dielectric substrate at least partially overlap with each other, to form a tunable capacitor electrically connected to the radiation component; wherein the first tuning electrode is used as the radiation component and the radiation component is used as the first tuning electrode, and the first tuning electrode and the radiation component are formed as a single piece; the antenna further comprises a phase shifter electrically connected to the radiation component; wherein the phase shifter comprises a first transmission line on a side of the first dielectric substrate close to the first tunable dielectric layer; a second transmission line on a side of the second dielectric substrate close to the first tunable dielectric layer; and a second tunable dielectric layer between the first transmission line and the second transmission line; the first transmission line, the radiation component and the first tuning electrode are arranged on the first dielectric substrate, and an orthographic projection of the first transmission line on the first dielectric substrate does not overlap with an orthographic projection of the radiation component and the first tuning electrode on the first dielectric substrate; and the second transmission line and the second tuning electrode are arranged on the second dielectric substrate; and wherein the first tunable dielectric layer is shared as the second tunable dielectric layer; and the control method comprises: applying a first voltage to the radiation component and the first tuning electrode; and applying a second voltage to the second tuning electrode according to a pre-stored table of a mapping relationship between the first voltage and the second voltage.

4. The control method for an antenna of claim 3, wherein before the applying the first voltage to the radiation component and the first tuning electrode; and applying the second voltage to the second tuning electrode according to the pre-stored table of the mapping relationship between the first voltage and the second voltage, the control method further comprises: applying the first voltage to the radiation component, obtaining a return loss of the antenna, and calculating a frequency offset corresponding to the first voltage; and when it is determined that the frequency offset is within a preset compensation range, applying the first voltage to the first tuning electrode, applying a test voltage to the second tuning electrode and adjusting the test voltage to have a magnitude so that the frequency offset corresponding to the obtained return loss of the antenna is beyond the preset compensation range, taking the test voltage having the magnitude as the second voltage and generating the table of the mapping relationship between the first voltage and the second voltage.

5. The control method for an antenna of claim 4, wherein the applying the first voltage to the radiation component, obtaining a return loss of the antenna, and calculating a frequency offset corresponding to the first voltage, comprises: applying the first voltage to the radiation component, obtaining the return loss of the antenna through a vector network analyzer, and calculating the frequency offset corresponding to the first voltage.

6. The control method for an antenna of claim 3, wherein the antenna further comprises: a first control line electrically connected to the radiation component, and a second control line electrically connected to the second tuning electrode.

7. An antenna array, comprising a plurality of antennas, each of which comprises: a first dielectric substrate and a second dielectric substrate opposite to each other; a first tunable dielectric layer between the first dielectric substrate and the second dielectric substrate; a radiation component and a first tuning electrode on the first dielectric substrate; and a second tuning electrode and a reference electrode layer on the second dielectric substrate; wherein orthographic projections of the radiation component, the first tuning electrode and the second tuning electrode on the first dielectric substrate overlap with an orthographic projection of the reference electrode layer on the first dielectric substrate; and wherein orthographic projections of the first tuning electrode and the second tuning electrode on the first dielectric substrate at least partially overlap with each other, to form a tunable capacitor electrically connected to the radiation components wherein the first tuning electrode is used as the radiation component and the radiation component is used as the first tuning electrode, and the first tuning electrode and the radiation component are formed as a single piece; the antenna further comprises a phase shifter electrically connected to the radiation component; wherein the phase shifter comprises a first transmission line on a side of the first dielectric substrate close to the first tunable dielectric layer; a second transmission line on a side of the second dielectric substrate close to the first tunable dielectric layer; and a second tunable dielectric layer between the first transmission line and the second transmission line; the first transmission line, the radiation component and the first tuning electrode are arranged on the first dielectric substrate, and an orthographic projection of the first transmission line on the first dielectric substrate does not overlap with an orthographic projection of the radiation component and the first tuning electrode on the first dielectric substrate; and the second transmission line and the second tuning electrode are arranged on the second dielectric substrate; and wherein the first tunable dielectric layer is shared as the second tunable dielectric layer.

8. An electronic device, comprising the antenna array of claim 7.

9. The antenna array of claim 7, further comprising: a first control line electrically connected to the radiation component, and a second control line electrically connected to the second tuning electrode.

* * * * *